United States Patent Office 3,795,612
Patented Mar. 5, 1974

3,795,612
LUBRICANTS CONTAINING CYCLIC ORGANO-PHOSPHORUS COMPOUNDS
Stamoulis Stournas, Trenton, Robert F. Bridger, Hopewell, and El Ahmadi I. Heiba, Princeton, N.J., assignors to Mobil Oil Corporation
No Drawing. Filed Nov. 2, 1971, Ser. No. 195,002
Int. Cl. C10n 1/48
U.S. Cl. 252—46.6      9 Claims

ABSTRACT OF THE DISCLOSURE

Cyclic organic phosphorus compounds are provided in which phosphorus is a component of the ring system and is either in the $P^3$ or $P^5$ valence state. Organic compositions comprising the compounds have excellent antioxidant properties.

BACKGROUND OF THE INVENTION

Field of the invention

The invention relates to new cyclic phosphorus compounds and to organic compositions, as for example lubricant compositions, containing these compounds. The compositions are less oxidation prone because of the presence of the inventive compounds.

Discussion of the prior art

It is well known in the art that many organic liquids and solids used in industrial and private applications are prone to deterioration and loss of ability to function when subjected to oxidation. These organic materials include oils having lubricating or non-lubricating viscosities, greases, power transmission fluids, resins and polymers and the like. Since these substances are very often used at high temperatures, the rate of oxidative deterioration can be very rapid. This problem is especially acute in the operation of modern automotive and aircraft engines. The breakdown of the lubricating oil used in these engines, whether natural or synthetic, is frequently accompanied by the formation of corrosive acids, sludge and other products usually associated with oxidation in these systems. Such products often harm the metal surfaces of the engine and almost always interfere with its effcient operation. In aggravated cases of oxidation, an engine can become inoperative or, in the more severe instances, can be destroyed as a working component.

No art is known that discloses the compounds of the invention or organic compositions made therewith, U.S. 3,089,850 teaches the use of certain phosphorus compounds, including some cyclic phosphorus compounds, as lubricating oil additives. However, these are used in the acid form or in the form of a salt of such acid, and they do not disclose or suggest the inventive compounds or the compositions containing them.

SUMMARY OF THE INVENTION

In accordance with the invention, there are provided compounds of the formula

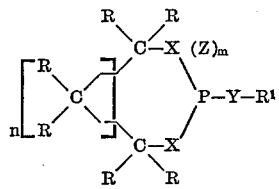

wherein R is selected from the group consisting of hydrogen and alkyl of from 1 to about 6 carbon atoms, $R^1$ is selected from the group consisting of alkyl of from about 6 to about 30 carbon atoms, and a radical of the formula

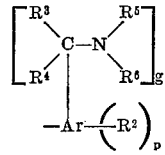

wherein Ar is an aromatic hydrocarbon of from 6 to about 14 carbon atoms, $R^2$ is an alkyl of from 1 to about 30 carbon atoms, $R^3$, $R^4$, $R^5$ and $R^6$ are individually selected from the group consisting of hydrogen and alkyl of from 1 to about 20 carbon atoms, $p$ is 0 or 1 and $q$ is 0 to 3, X and Y are selected from the group consisting of oxygen, sulfur and

wherein $R^7$ is selected from the group consisting of an aromatic hydrocarbon of from 6 to about 14 carbon atoms, hydrogen and alkyl of from 1 to about 6 carbon atoms, Z is selected from the group consisting of oxygen and sulfur, $n$ is from 0 to 10 and $m$ is 0 or 1.

DISCUSSION OF SPECIFIC EMBODIMENTS

The compounds of this invention can be made by reacting a glycol of the formula $HO(CH_2)_xOH$, where $x$ is from 2 to about 10, with a phosphorus trihalide, followed by reaction of this product with a phenol or thiophenol. The following summarizes the synthesis of the compounds of the invention using the glycol and phosphorus trichloride:

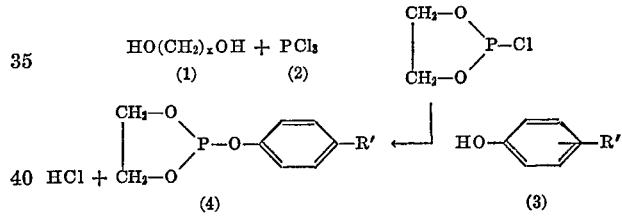

If Compound 2 is $POCl_3$ or $PSCl_2$, Compound 4 will contain phosphorus having a valence of 5 and an oxygen or sulfur, respectively, attached thereto. Also, if (3) is a thiophenol or an amine, then the atom bridging the phenyl ring with phosphorus is sulfur or nitrogen. Finally, to obtain an atom other than oxygen in the ring, compounds such as $HSCH_2CH_2OH$ or $H_2NCH_2CH_2OH$ can be used.

Among the glycols that can be used are those having 2 to 10 carbon atoms and terminal OH groups. That is, ethylene glycol, 1,3-propanediol, 1,4-butanediol, and so forth to 1,10-decanediol. When these glycols are used, R in the abovedescribed generic formula is hydrogen. Also useful are 2,3-propanediol, 2,3-butanediol, 1,2-butanediol, 1,4-pentanediol, 2,3-pentanediol, 3,4-hexanediol and 4,5-octanediol. These latter give compounds in which R is a hydrocarbyl group.

Illustrative of the useful thio glycols are 2-mercapto ethanol, 3-mercapto propanol, 1,2-ethanedithiol and compounds corresponding to the general formulas

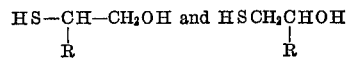

wherein the R group is commensurate with the phosphorus-containing compounds defined herein.

Some amine derivatives which may be mentioned are 2-methylaminoethanol, 2-anilinoethanol and N,N′-dimethyl-1,2-ethylenediamine.

Depending upon the bridging atom desired, one can, as has already been indicated, use an amine, a phenol or a thiophenol. Thus, phenol itself, thiophenol itself, methylphenol or -thiophenol, ethylphenol or -thiophenol, octylphenol or -thiophenol, nonylphenol or -thiophenol, dodecylphenol or -thiophenol and the like can be employed. It will be understood that "phenol" and "thiophenol" are being used in their broadest sense to include all such members having up to the stated 14 carbon atoms. The corresponding amines, e.g. methyl aniline, ethyl aniline, and so forth up to dodecylaniline may be used.

The phosphorus trihalides useful in making the inventive products may have as the halide a chloride, iodide or bromide ion. In the practice of the invention the chloride is preferred because of its ready availability and reduced cost. Thus we preferably use $PCl_3$ for the $P^3$ ring compounds and $PSCl_3$ or $POCl_3$ for the $P^5$ ring compounds.

In the reaction involving phosphorus trihalides and glycols, for example, we prefer not to exceed a ratio of 1 mole of $PX_3$ to 1 mole of glycol. The 1:1 molar ratio, as well as the temperature selected for reaction, favors formation of the ring by reaction of both hydroxyls of each glycol with two of the halides of the phosphorus trihalide. In reaction mixtures containing more glycol than is necessary for a 1:1 molar ratio, there is the possibility that two or more glycol molecules would react with each $PX_3$ molecule, giving a product which would comprise polymers as well as one or more of the following

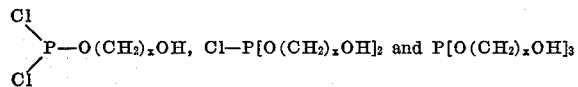

As has already been suggested, the temperature of reaction during this initial reaction must not be high enough to favor formation of appreciable amounts of the products enumerated immediately above. We have found that the preferred reaction will be obtained when the temperature does not exceed about 85° C. The lowest temperature at which an acceptable rate of reaction will occur is about 0° C. The optimum, or preferred, temperature will range from about 35° C. to about 45° C.

The reaction of the phenol with the glycol-phosphorus trihalide product may be carried out efficiently at a temperature within the range of from about 30° C. to about 100° C., preferably from about 75° C. to about 85° C.

Having described the invention in general terms, the following examples are offered as specific illustrations of the practice thereof. It will be understood that the examples are strictly illustrative and that no limitations are intended by their selection.

EXAMPLE 1

A solution of 21 gm. (0.17 mole) of 2-chloro-1,3,2-dioxaphospholane

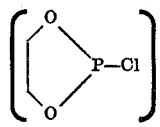

in 50 ml. benzene was added dropwise to a stirred solution of 39.3 gm. (0.15 mole) of dodecyl phenol and 16 gm. triethylamine (0.16 mole) in 500 ml. benzene. A copious white precipitate formed. After the addition was complete, the mixture was heated to 80° C. for 30 minutes and was then cooled to room temperature, washed with water, 5% aqueous sodium hydroxide and water again. After drying, the benzene was evaporated off to yield 49.9 gm. of product as a thick, clear oil. Yield: 94.4%.

EXAMPLE 2

To a solution of 7.8 gm. of 2-mercapto ethanol and 21 gm. of triethylamine in 250 ml. of benzene was added dropwise 13.75 gm. phosphorus trichloride. After the addition was complete, the mixture was heated to 80° C. for 30 minutes. After cooling slightly, a solution of 26.2 gm. of dodecyl phenol and 11 gm. of triethylamine in 150 ml. of benzene was added rather fast, and the resulting mixture was heated to 80° for one hour. After the precipitate was filtered off and discarded, the benzene solution was washed with 5% aqueous sodium hydroxide and water, dried, and the benzene was evaporated off to yield the desired product.

EXAMPLE 3

Same amounts of materials and same procedure as given for Example 2, except that 22.0 gm. nonylphenol was used instead of the dodecyl phenol.

EXAMPLE 4

A solution of 13.7 gm. of phosphorus trichloride in 100 ml. of benzene was added dropwise to a solution of 7.5 gm. of 2-methylamino-ethanol and 20.5 gm. of triethylamine in 400 ml. of benzene. After the addition was complete, the mixture was heated to 80° C. for 30 minutes and then a solution of 26.2 gm. of dodecyl phenol and 10.2 gm. of triethylamine in 150 ml. of benzene was added in one portion. The resulting mixture was heated to 80° C. for one hour, allowed to cool and washed with 5% aqueous sodium hydroxide and water. After drying, the benzene was evaporated off to yield the desired product.

EXAMPLE 5

Same procedure and amounts of materials as given for Example 4, except that 13.7 gm. of 2-anilinoethanol was substituted for the methylaminoethanol.

EXAMPLE 6

A solution of 12.7 gm. of 2-chloro-1,3,2-dioxaphospholane

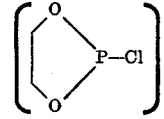

in 30 ml. of benzene was added dropwise to a solution of 26.1 gm. of dodecyl aniline and 11 gm. of triethylamine in 200 ml. of benzene. The mixture was heated to 80° for 1 hour, filtered, and washed with 5% aqueous sodium hydroxide and water. Drying and evaporation of the solvent afforded the desired product.

EXAMPLE 7

This compound was prepared the same way and using the same quantities of materials as for the compound of Example 1, except that 24.4 gm. of 2-chloro-1,3,2-dioxaphosphorane was used in the place of 1,3,2-dioxaphospholane.

EXAMPLE 8

A solution of 7.8 gm. of 2-mercaptoethanol, 15.3 gm. of phosphorus oxychloride ($POCl_3$) and 16 gm. of pyridine in 300 ml. of benzene was heated under reflux (80° C.) for 20 minutes, and then was added to a solution of 26.2 gm. of dodecyl phenol and 8 gm. of pyridine in 200 ml. of benzene. After heating to 80° C. for a further 1½ hours, the mixture was filtered, washed with water, and dried. Evaporation of the solvent afforded the desired product.

EXAMPLE 9

This compound was prepared in the same fashion as the compound of Example 8, except that 6.2 gm. of ethylene glycol was used in the place of mercapto-ethanol, and 16.9 gm. of thiophosphoryl chloride ($SPCl_3$) was used in the place of phosphorus oxychloride.

EXAMPLE 10

Same procedure as for the compound of Example 1, except that 40.5 gm. of n-octadecanol was used in the place of dodecyl phenol.

EXAMPLE 11

This compound was made the same way and with the same amount of materials as for the compound of Example 1, except that 47.8 gm. of 2-dimethylaminomethyl-4-dodecyl-phenol was substituted for the dodecyl phenol.

EVALUATION OF PRODUCTS

Blends of the additives were prepared in Kuwait oil (oil prepared from a Kuwait distillate by furfural refining and methylethyl ketone dewaxing; it has a viscosity at 100° F. of 107 S.U.S. and at 210° F. of 40.1 S.U.S.), and oxygen was circulated through each test sample at 175° C. for 20 hours at the rate of 5 liters per hour. The size of each sample was 30 grams. The following table summarizes the results as moles of $O_2$ absorbed per kg. of oil over 20 hours, or as the time ($t_{1.0}$) required for 1 kg. of oil to absorb 1 mole of $O_2$.

| Additive of Example | Additive | Mole $O_2$/kg., 20 hours | $t_{1.0}$, hours |
|---|---|---|---|
| None | | 1.00 | 20±2 |
| 1 | CH₂—O\P—O—⟨⟩—C₁₂H₂₅ / CH₂—O | 0.09 | 64.0 |
| 2 | CH₂—S\P—O—⟨⟩—C₁₂H₂₅ / CH₂—O | 0.08 | 61.1 |
| 3 | CH₂—S\P—O—⟨⟩—C₉H₁₉ / CH₂—O | 0.21 | 56.3 |
| 4 | CH₃ \| CH₂—N\P—O—⟨⟩—C₁₂H₂₅ / CH₂O | 0.14 | -------- |
| 5 | C₆H₅ \| CH₂—N\P—O—⟨⟩—C₁₂H₂₅ / CH₂—O | 0.12 | -------- |
| 6 | CH₂—O\P—NH—⟨⟩—C₁₂H₂₅ / CH₂—O | 0.40 | -------- |
| 7 | CH₂—O, O\P—O—⟨⟩—C₁₂H₂₅ / CH₂—O | 0.25 | -------- |
| 8 | CH₂—S, O\P—O—⟨⟩—C₁₂H₂₅ / CH₂—O | 0.12 | -------- |
| 9 | CH₂—O, S\P—O—⟨⟩—C₂₁H₂₅ / CH₂—O | 0.41 | ------ |
| 10 | CH₂—O\P—O—C₁₈H₃₇ / CH₂—O | 0.53 | -------- |
| 11 | CH₂—O\P—O—⟨⟩—C₁₂H₂₅ (with CH₂N(CH₃)₂) / CH₂—O | 0.25 | 49.7 |

When used either as antioxidants or as antiwear agents, the products of this invention can be used in concentrations ranging from about 0.01% to about 10% by weight of the organic compound used. Preferably the amount will be taken from the range of from about 0.1% to about 2% by weight of the compound.

The inventive compounds may be employed with a variety of organic materials. These include lubricating oils of different origins and characteristics as well as the greases made therefrom. Such lubricating oils include both mineral and synthetic oils such as synthetic esters, synthetic hydrocarbons, silicones and the like. The mineral oils include naphthenic, paraffinic and, especially, oils containing at least 1% and up to about 30% of aromatics, as well as mixed base oil, oils which have been acid or solvent refined and those which have been hydrocracked. The synthetic oils include olefin polymers, such as polymers of propylene and butylene, alkylene oxide polymers, dicarboxylic acid esters and phosphorus acid esters. Also included are the polypropylene glycols, di-(2-ethylhexyl) sebacate, di-(2-ethylhexyl) adipate and esters of pentaerythritol and monocarboxylic acids. In general, the additives of the invention can be used in various lubricant compositions, such as automobile lubricants, marine oils, hydraulic fluids, industrial lubricants and the like, which may require good antiwear or antioxidant resistance at high temperatures. The present products are particularly suitable for use in gas turbine engines such as those used in jet aircraft. Other organic materials include exchange fluids, power transmission fluids, polyolefinic polymers in the form of molded, cast or extruded shapes, or coatings, such as are derived from polyethylene, polybutene, polybutadiene, polyvinyl products, natural and synthetic elastomers, such as natural rubber and GR-S rubber, and the like.

Although the present invention has been described with certain specific embodiments, it is to be understood that modifications and variations may be resorted to without departing from the spirit and scope of this invention as those skilled in the art will readily understand. Such modifications and variations are considered to be within the purview and scope of the appended claims.

We claim:

1. An organic composition comprising a lubricating oil or grease and an antioxidant or anti-wear amount of a compound of the formula

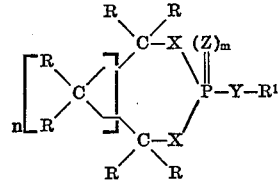

wherein R is selected from the group consisting of hydrogen and alkyl of from 1 to about 6 carbon atoms, $R^1$ is a radical of the formula

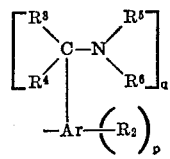

wherein Ar is an aromatic hydrocarbon of from 6 to about 14 carbon atoms selected from the group consisting of phenylene, naphthylene and anthrylene, $R^2$ is an alkyl of from 1 to about 30 carbon atoms, $R^3$, $R^4$, $R^5$ and $R^6$ are individually selected from the group consisting of hydrogen and alkyl of from 1 to about 20 carbon atoms, $p$ is 0 or 1 and $q$ is 0 to 3, X and Y are selected from the group consisting of oxygen, sulfur and

wherein $R^7$ is selected from the group consisting of an aromatic hydrocarbon of from 6 to about 14 carbon atoms, hydrogen and alkyl of from 1 to about 6 carbon atoms, Z is selected from the group consisting of oxygen and sulfur, $n$ is from 0 to 10 and $m$ 0 or 1.

2. The composition of claim 1 wherein said compound is present in a concentration of from about 0.01% to about 10% by weight.

3. The composition of claim 1 wherein the organic material is a lubricating oil.

4. The composition of claim 3 wherein the lubricating oil is a mineral lubricating oil.

5. The composition of claim 1 wherein the compound has the formula

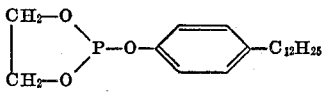

6. The composition of claim 1 wherein the compound has the formula

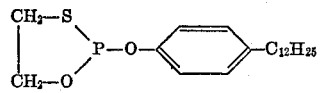

7. The composition of claim 1 wherein the compound has the formula

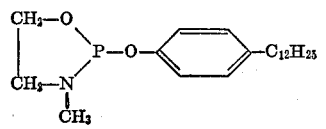

8. The composition of claim 1 wherein the compound has the formula

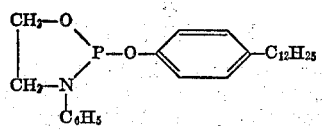

9. The composition of claim 1 wherein the compound has the formula

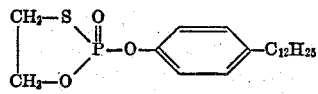

References Cited
UNITED STATES PATENTS

| | | | |
|---|---|---|---|
| 3,192,162 | 6/1965 | Bartlett et al. | 252—46.6 |
| 2,661,365 | 12/1953 | Gamrath et al. | 252—46.6 X |
| 2,894,016 | 7/1959 | Lanham | 252—46.7 X |
| 2,978,478 | 4/1961 | Sandner | 252—49.8 X |
| 3,070,619 | 12/1962 | Lanham | 252—46.6 X |
| 3,135,694 | 6/1964 | Loughran et al. | 252—46.6 |
| 3,147,297 | 9/1964 | Hechenbleikner | 252—46.6 X |
| 3,184,495 | 5/1965 | Baranauckas et al. | 252—46.6 X |
| 3,184,496 | 5/1965 | Baranauckas et al. | 252—46.6 X |

HELEN M. S. SNEED, Primary Examiner

U.S. Cl. X.R.

252—46.7, 49.8, 49.9